Figure 8:
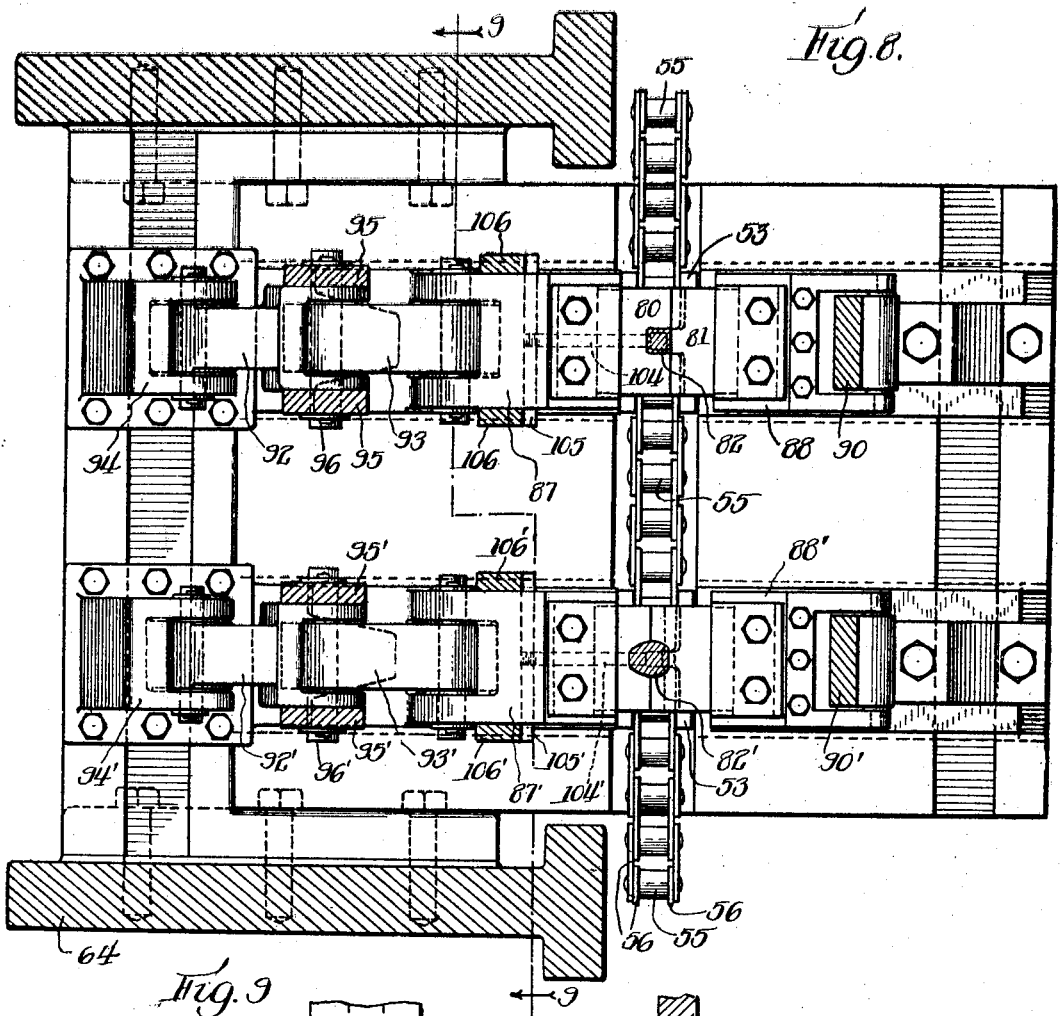

Sept. 1, 1931.  C. H. FREDERICK  1,821,888
SPIKE MAKING MACHINE
Filed Oct. 20, 1928  7 Sheets-Sheet 1
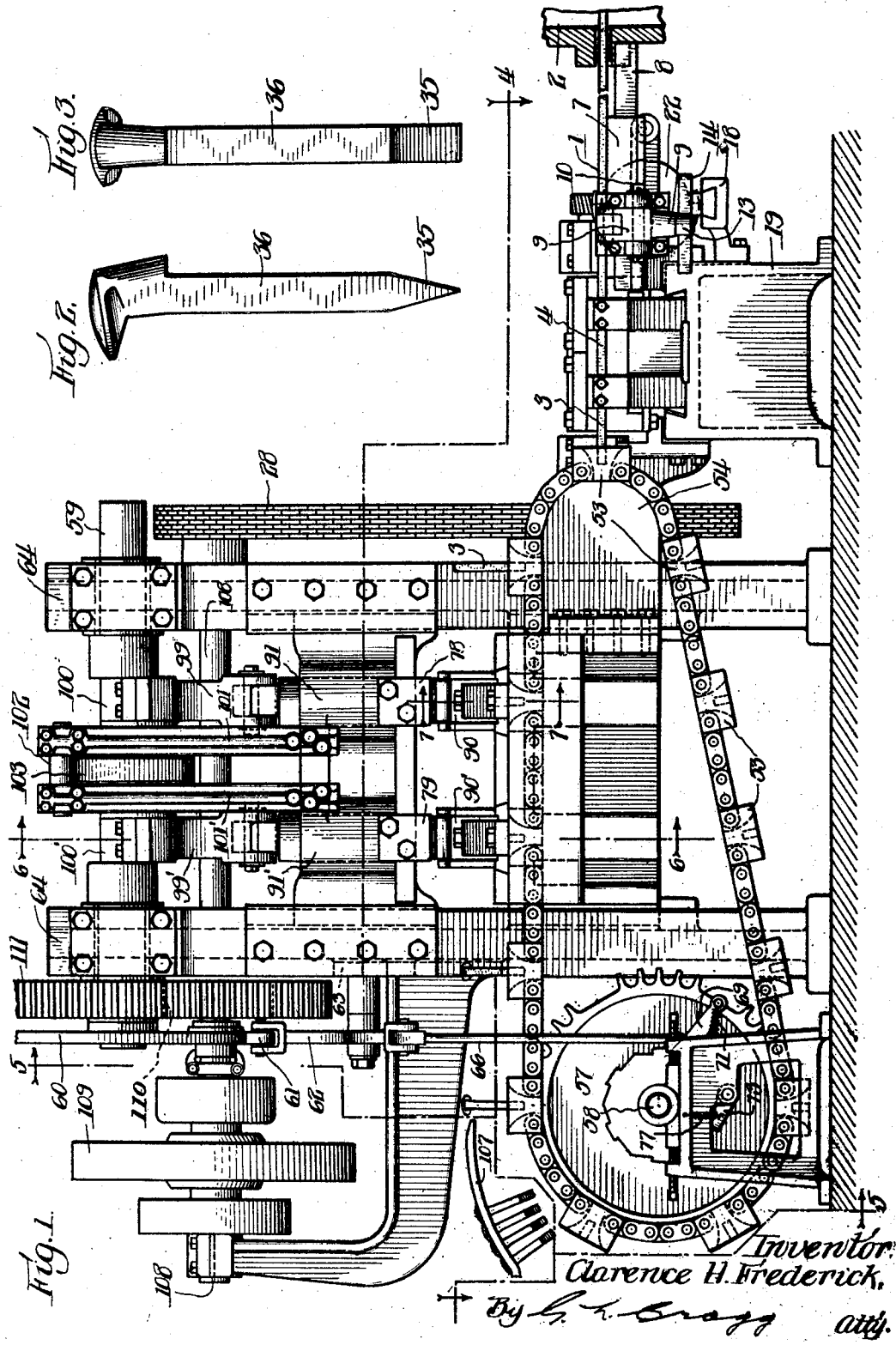
Inventor
Clarence H. Frederick,
By G. L. Cragg
atty.

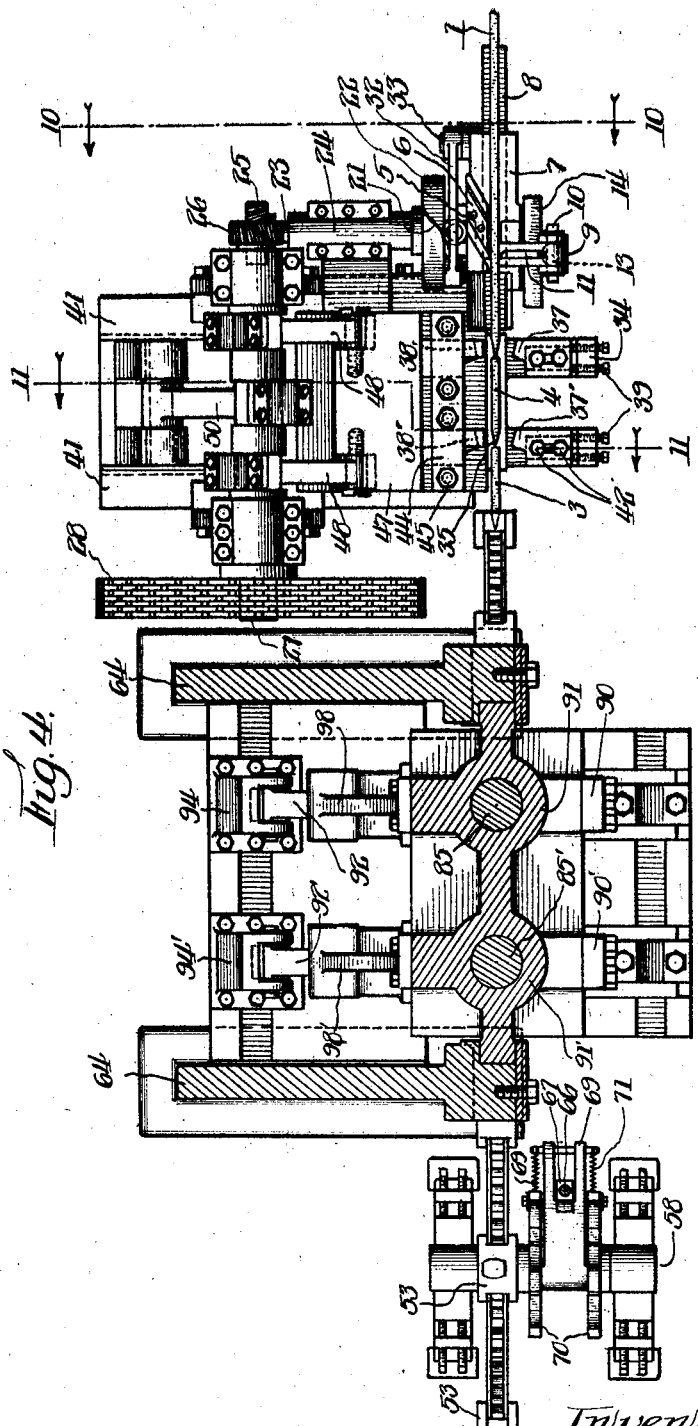

Sept. 1, 1931.  C. H. FREDERICK  1,821,888
SPIKE MAKING MACHINE
Filed Oct. 20, 1928  7 Sheets-Sheet 3
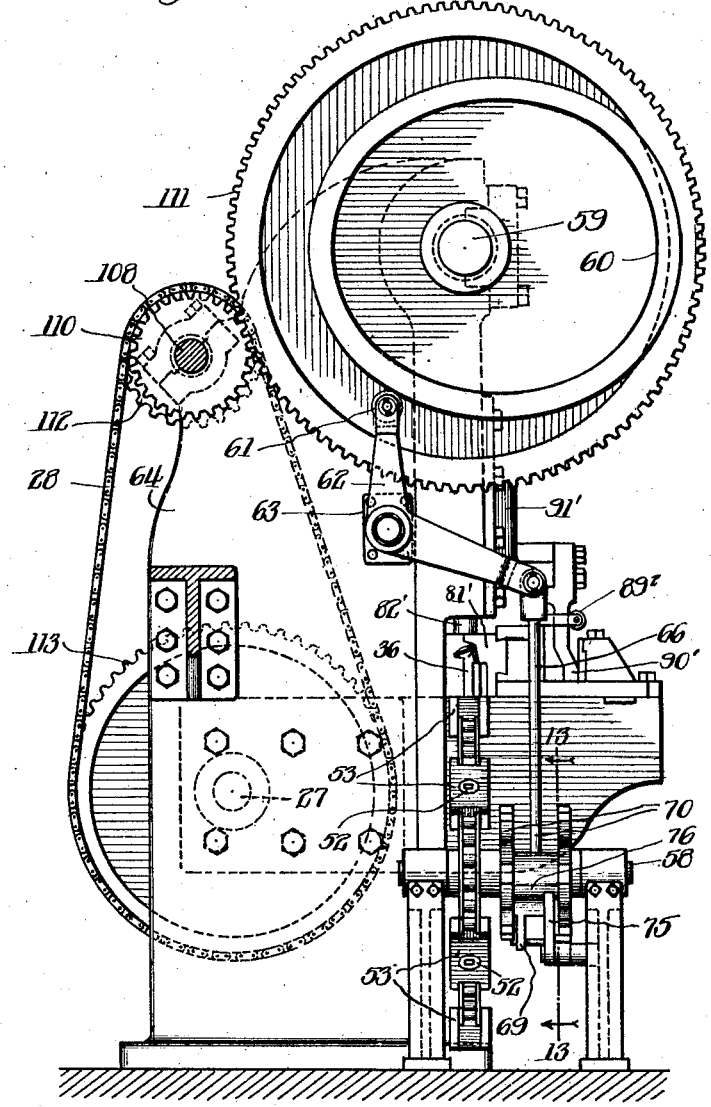
Inventor
Clarence H. Frederick,
By G. L. Gragg atty.

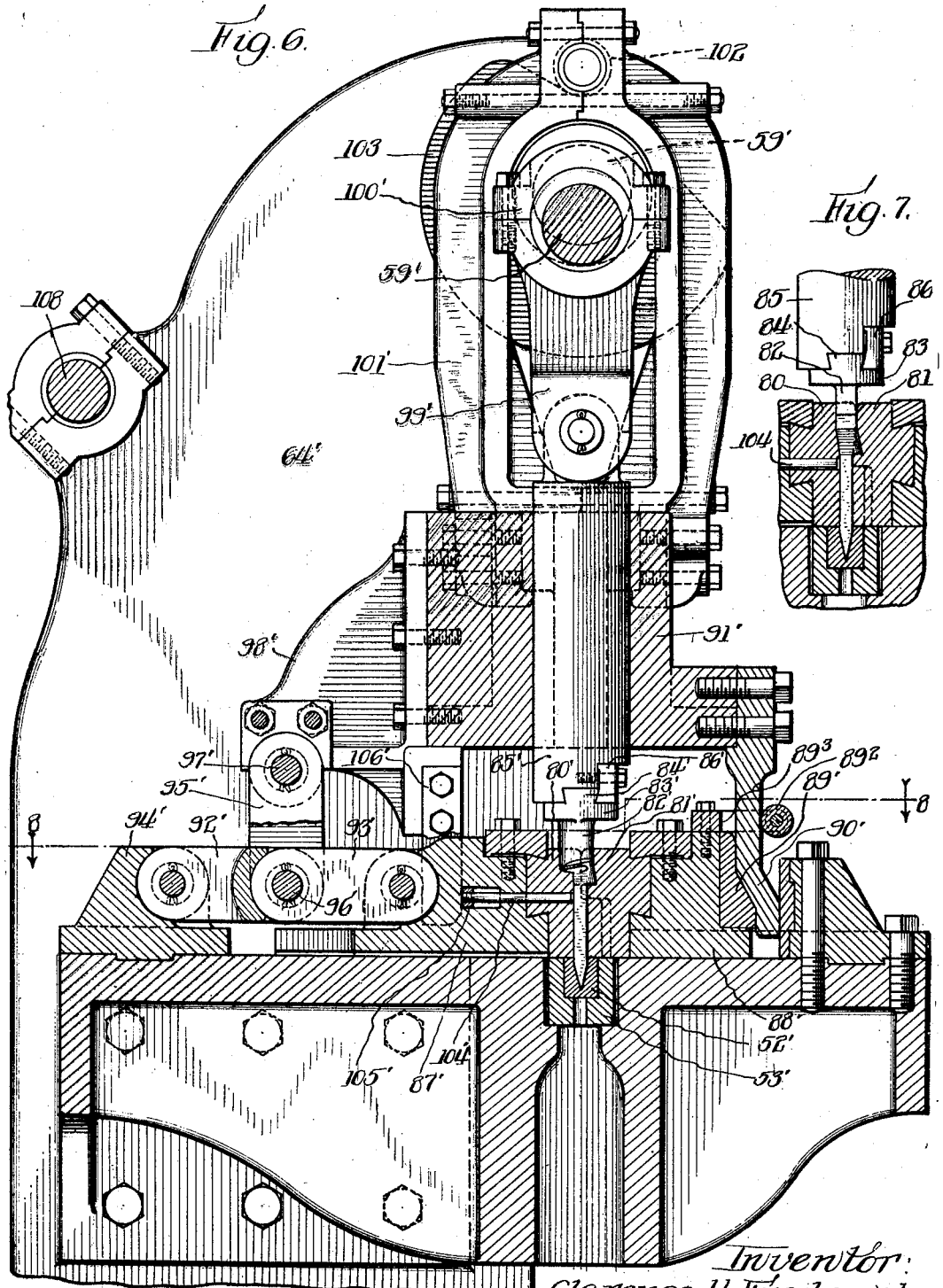

Sept. 1, 1931.　　　C. H. FREDERICK　　　1,821,888
SPIKE MAKING MACHINE
Filed Oct. 20, 1928　　　7 Sheets-Sheet 5

Inventor:
Clarence H. Frederick,
By G. L. Gregg Atty.

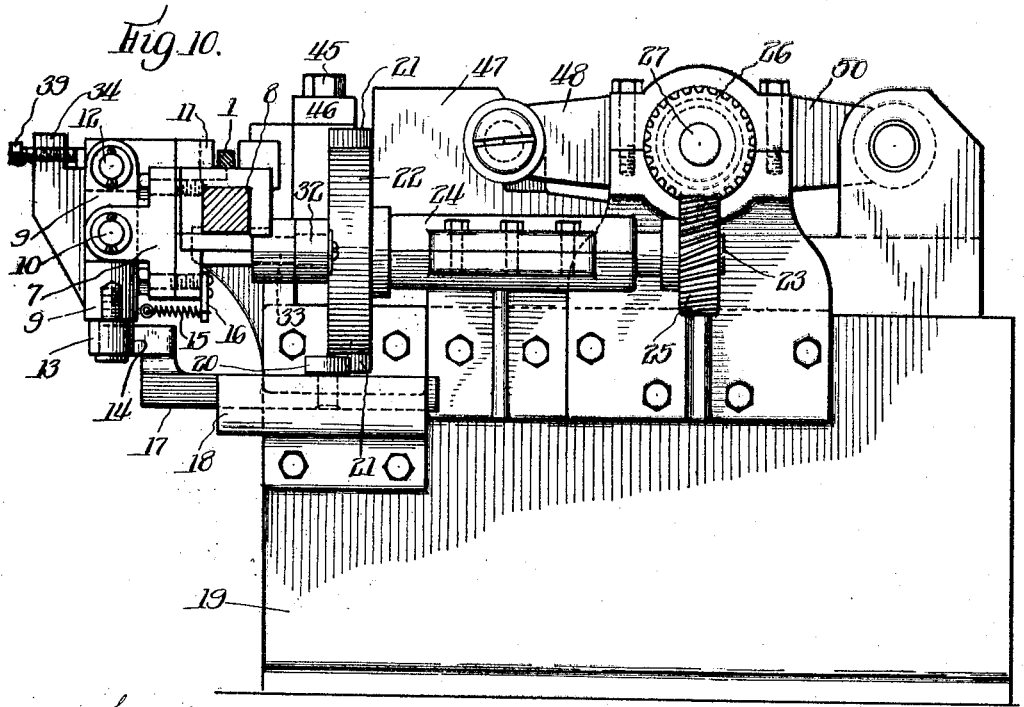

Sept. 1, 1931. C. H. FREDERICK 1,821,888
SPIKE MAKING MACHINE
Filed Oct. 20, 1928  7 Sheets-Sheet 7

Inventor:-
Clarence H. Frederick
By G. L. Bragg Atty.

Patented Sept. 1, 1931

1,821,888

UNITED STATES PATENT OFFICE

CLARENCE H. FREDERICK, OF KENOSHA, WISCONSIN, ASSIGNOR TO CLAYTON L. SMYTHE, OF CHICAGO, ILLINOIS

SPIKE MAKING MACHINE

Application filed October 20, 1928. Serial No. 313,832.

My invention relates to spike making machines and is of particular service in the making of railway spikes that are employed for anchoring railway rails to rail ties.

The invention has for one of its objects the provision of a machine having increased capacity for making spikes. A machine which is adapted to accomplish this object is inclusive of two female dies formed to receive blanks from which the spikes are to be made and having enlarged cavities receiving the blank ends that are to be upset into spike heads, the head forming cavity of one die being smaller than the spike heads that are to be produced and the head forming cavity of the other die completely conforming to the shape and size of the spike heads, upsetting punches for entering said enlarged cavities to upset the blank ends therein, unitary mechanism in operating relation to said punches, and mechanism for transferring the partially upset blank from the first die to the second dies, whereby the head upon one spike is partially formed and the head upon another spike is finished in one operation of said unitary mechanism. In the preferred embodiment of my invention the unitary mechanism is inclusive of carriers preferably in the form of plungers for the upsetting punches, mechanism for effecting the reciprocation of the carriers together with the punches thereon, and guides for directing the movements of the carriers. The punches are desirably maintained in relative position to be simultaneously entered within and withdrawn from the dies. By the machine thus far described two spike blanks may be operated upon in each cycle of operation of the machine, one spike blank being partially formed into a spike and the other spike blank, which is such a partially finished spike, being finally operated upon to complete the spike.

Such a machine may be employed to make spikes with heads of larger size and of shapes that cannot readily be produced by single blow machines. Moreover the spike blanks do not have to be as hot when the machine of my invention is employed as when they are operated upon in single blow machines, whereby the scaling of the spikes is reduced or eliminated and the temperature losses are reduced.

My invention has for another object the provision of improved means for positioning the spike blanks while they are being operated upon to complete them into spikes. This object of my invention may be realized in a machine employing but one female die and one upsetting punch complemental thereto. Such die is divided into two separable sections which meet in the plane of the blank receiving cavity thereof. A clamp is employed which includes two jaws between which the female die is disposed, each of said jaws being movable toward and from the other. There is a wedging member and mechanism for operating it to enable it to operate upon one jaw of the clamp to quickly position this jaw into holding relation with one of the die sections into which the female die is divided, and mechanism is provided for moving the second clamping jaw toward the first to clamp the spike blank that is between the die sections.

The machine of my invention preferably also includes a stripping rod that is projectable against a headed spike that is between the sections of the female die and wherein there is also a positioning device for said rod and coupled with the wedging member and having a dimension enabling it to hold said rod in stripping relation to the spike during the initial part of the withdrawing movement of the second clamping jaw and thereafter to have escaping relation with said rod.

The machine of my invention is also desirably inclusive of improved means for subdividing long bars into sections of equal length and is, to this end, inclusive of means for effecting intermittent travel of the bar longitudinally thereof and in steps corresponding to the length of the sections to be subdivided therefrom, and two subdividing tools spaced apart along the line of travel of the bar, one being positioned to operate upon the bar at places upon the bar previously operated upon by the other, the latter subdividing tool serving to partially effect a severance of the bar and the other to complete such severance. Means are desirably provided whereby equal lengths into which long bars may be subdivided may be varied in extent.

Figure 9:
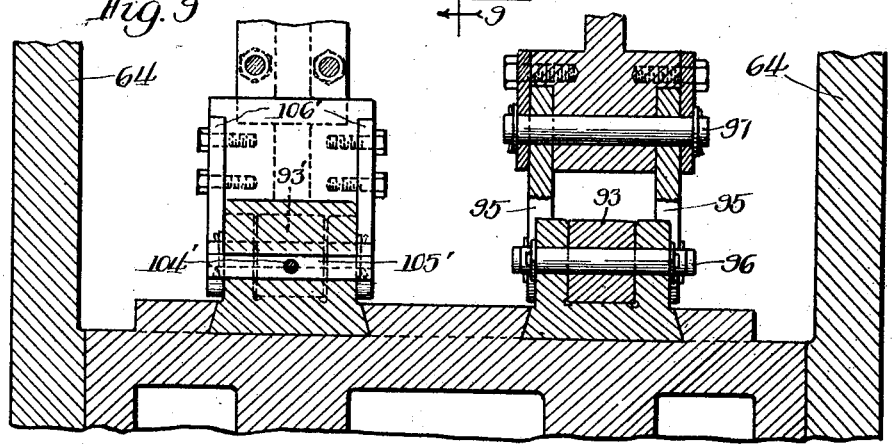
Figure 12:
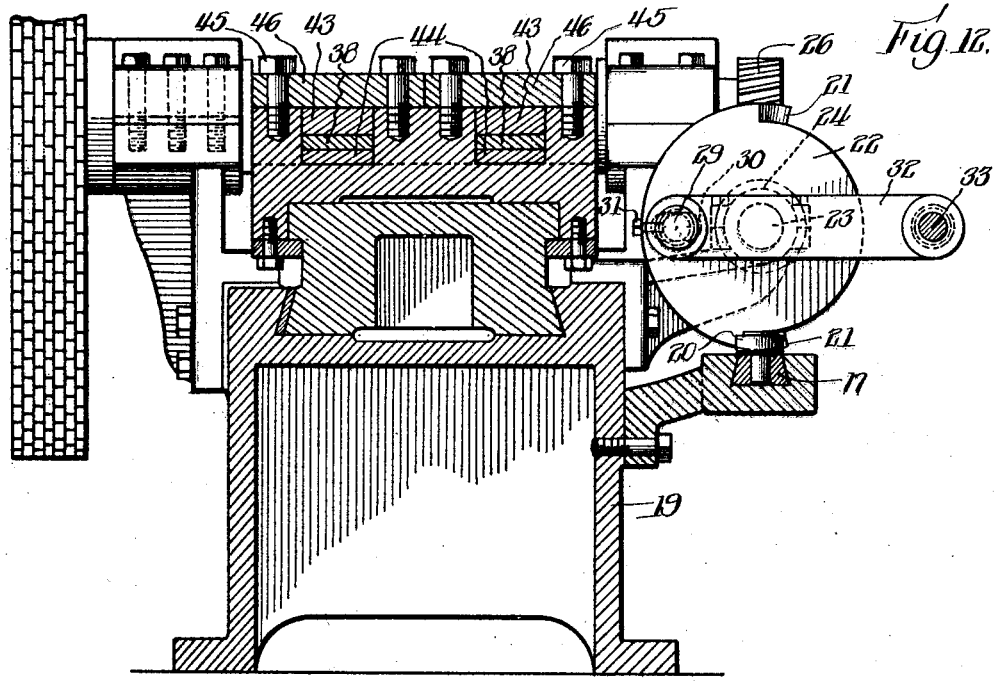
Figure 13:
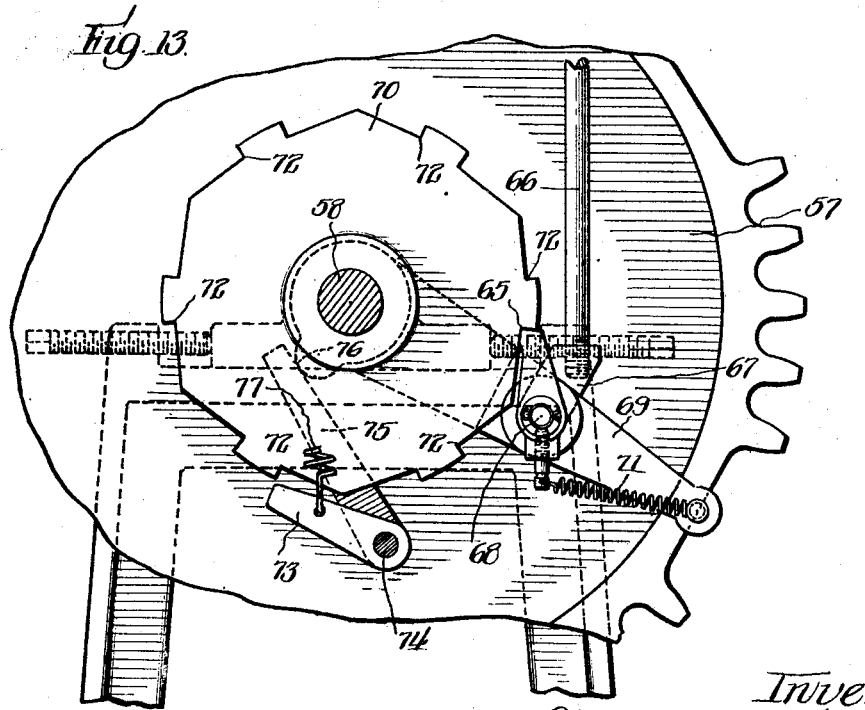

The invention has other characteristics and will be more fully described in connection with the accompanying drawings in which Fig. 1 is a view in elevation of a machine constructed in accordance with the preferred embodiment of the invention; Fig. 2 is one elevation of a railway spike which may be made by the machine shown in Fig. 1; Fig. 3 is an elevation of such a spike taken at right angles to the direction in which Fig. 2 is taken; Fig. 4 is a sectional view on line 4—4 of Fig. 1; Fig. 5 is a sectional view on line 5—5 of Fig. 1; Fig. 6 is a sectional view on line 6—6 of Fig. 1, on a larger scale; Fig. 7 is a sectional view on line 7—7 of Fig. 1, on a larger scale; Fig. 8 is a sectional view on line 8—8 of Fig. 6; Fig. 9 is a sectional view on line 9—9 of Fig. 8; Fig. 10 is a sectional view on line 10—10 of Fig. 4, on a larger scale; Fig. 11 is a sectional view on line 11—11 of Fig. 4, on a larger scale; Fig. 12 is a sectional view on line 12—12 of Fig. 11; and Fig. 13 is a sectional view on line 13—13 of Fig. 5, on a larger scale.

The long bars, of which one 1 is shown in Fig. 1 may be formed from billets of low carbon steel in accordance with well known rolling mill practice. The bars are desirably passed through the reheating furnace diagrammatically indicated at 2 in Fig. 1, in order that they may be presented to the subdividing mechanism that forms them into spike blanks 3, 4 of suitable length. Each bar 1 is drawn from the reheating furnace by suitable feeding mechanism which causes such bar to be moved step by step, each step being of the length of the spike blanks. The feeding mechanism illustrated is inclusive of a nose 5 which is adjustably held in place by the clamp 6, this clamp being fixed upon a carriage 7 which is slidable upon a guide bar 8. Said carriage and bar 8 are below the bar 1. A lever 9 is intermediately pivoted at 10 upon the carriage, this lever being adapted to turn in a plane at right angles to the travel of the bar 1. A gripping nose 11, complemental to the nose 5, is pivoted at 12 upon the upper end of lever 9 and is movable with this lever in a plane at right angles to the direction of travel of the bar 1. A cam roller 13 is pivoted upon the lower end of lever 9 and is pressed against a cam track 14 by means of a spring 15 which is secured at one end to the lower end of the lever and at its other end to a post 16 which is carried by the aforesaid carriage. The cam track is movable transversely of the line of travel of the bar 1, this cam track being provided upon a block 17 which slides within a guide 18 that is bolted to the bed 19 of the subdividing mechanism. The block 17 carries a cam roller 20 which is operable by the cams 21 upon a wheel 22. This wheel is fixed upon a shaft 23 that extends at right angles to the line of travel of the bar 1, this shaft being supported by a bearing 24 which is carried by the bed 19. Shaft 23 carries a spiral gear 25 coaxially therewith, this gear being in mesh with another spiral gear 26 which is fixed upon a shaft 27 that extends longitudinally of the line of travel of the bar 1. The shaft 27 is suitably driven as by means of the link belt 28. A crank pin 29 is carried by the wheel 22 which is thus a crank wheel, and is preferably adjustable radially of this wheel within a radial slot 30 formed in the wheel. Pin 29 is held in position by means of a bolt 31 which is carried by the wheel 22 and is so assembled with the wheel that it cannot be moved along its own axis, but may be turned. This bolt is screwed into the pin 29 so that when the bolt is turned the pin may be adjusted in position. A pitman 32 is journaled at one end upon the pin 29 and at its other end on a stud 33 which is fixed upon the carriage 7. By means of the pitman and the parts in cooperative relation therewith the carriage 7 may be reciprocated upon the bar 8, the extent of this reciprocation being determined by the position selected for the crank pin 29 upon the wheel 22. When the carriage 7 is moved away from the furnace 2 the complemental noses 5 and 11 grip the bar 1 therebetween and force the movement of this bar away from the furnace, such movement being co-extensive with the length of the spike blanks that are to be produced. Simultaneously with the initiation of the forward movement of the carriage 7 from the furnace 2 the lever 9 is turned by one of the cams 21 to bring the nose 11 into engagement with the bar 1. When the forward movement of the carriage has been completed the lever 9 is released, the roller 20 then having passed out of engagement with the cam 21 which actuated it, so that the bar 1 is not gripped between the noses 5 and 11 and is permitted to remain in a position to which it has been advanced. The movement of the carriage back to the furnace 2 equals, in extent, the length of each of the blanks 3, 4, the places of engagement of said noses with said bar 1 being thus spaced apart distances that are equal to the lengths of said blanks. As the bar 1 is hot said noses are apt to indent the same, but the bar is not thereby disfigured since the indentations made by the noses are the places upon the bar at which the bar subdividing tools, presently to be described, operate. The bar 1 is passed, by the feeding mechanism which has been described, through two bar subdividing tools which operate upon the bar at places which are spaced apart distances equal to the lengths of the sections 3, 4. The rearmost subdividing tool 34 serves to partially effect a severance of the bar and to partially form the entering point or wedge 35 which pertains to the completed spike 36 shown in Figs. 2 and 3. This subdividing tool is inclusive of two aligned complemental horizontal knives 37, 38 arranged in the plane of travel of the bar 1 that passes between these knives. Said knives are mutually approached to partially sever the bar and are thereafter mutually separated. The mechanism for effecting the mutual movement of these knives is most clearly illustrated in Fig. 11. The knife 37 is adjusted in position by the adjusting bolt 39 that is threaded in the bed 40, which is slidable in a guide 41 that extends transversely of the line of travel of the bar 1 and is provided upon the bed 19. Said knife 37 is held in its adjusted position by means of the clamping bolts 42 that are screwed into the outer end of the bed 40. The knife 38 is clamped between two horizontal plates 43, 44 which are spaced apart a distance equal to the width of the bar 1 which is usually square. Means whereby the knife 38 is clamped in place is desirably inclusive of the bolts 45 and the clamping bar 46 through which these bolts pass into the cross head 47, which is slidable transversely of the bar 1 upon the bed 40. When the knives 37 and 38 operate upon the bar 1, the plates 43, 44 lap the bar so as to hold it from vertical displacement. The knives are mutually moved toward each other and away from each other by means of the shaft 27. The cross head 47 which carries the knife 38 is connected by means of two links 48 with the shaft 27 through the intermediation of cylindrical offset portions of this shaft, one of these offset portions being illustrated at 49 in Fig. 11. A link 50 connects the reciprocating bed 40 with another cylindrical offset portion 51 of the shaft 27, this latter offset portion being separated 180° from the offset portions 49. Thus during each revolution of the shaft 47 the knives 37 and 38 are approached to partially sever the bar 1 and to partially form it into wedge shape as indicated in Fig. 4 and are thereafter separated to permit the bar to be advanced another step. When the bar is advanced another step the place where it is partially severed is brought into register with another pair of knives 37', 38' which finish the severance partially effected by the knives 37 and 38 and finish the wedging formation 35. The knives 37', 38' are desirably duplicates of the knives 37 and 38 respectively and are assembled with the shaft 27 similarly to the assembly of the knives 37 and 38 with said shaft. The two subdividing devices are thus identical excepting that the knives 37' and 38' are a little more closely approached in their severing operation than are the knives 37 and 38, whereby the severance of the bar may be completed. It will be thus apparent that the bar is divided into various equal length sections 3, 4. Each of these bar sections constitutes a spike blank. As each spike blank that is about to have its severance completed by the knives 37', 38' is advanced to position for this purpose the wedging end 35 thereof is snugly forced into a correspondingly shaped wedging recess in a block 52 which, in the embodiment of the invention illustrated, is carried by a link 53 of an endless conveyor chain. This conveyor chain is also inclusive of other links which couple the links 53 and the blocks 52 in suitably spaced apart relation, in order that the spike blanks carried by said blocks may be properly presented to the die mechanisms that are to operate upon the blanks to upset the blunt ends thereof into spike heads.

The chain is intermittently operated so that the spike blanks may remain at rest while being operated upon by such die mechanisms. As illustrated the bight of the chain which is adjacent the knives 37', 38' passes over an idler semi-circular stationary guide 54, the chain having rollers 55, which roll upon the guide 54. The innermost links 56 of the chain embrace the semi-circular edge of the guide 54 whereby the chain is held in a fixed plane of travel. The chain is driven by a sprocket wheel 57 which is fixed upon the shaft 58. This shaft is turned one-sixth of a revolution for each cycle of operation, power being transmitted from the main driving shaft 59 through the intermediation of the mechanism which will now be described. The elliptical cam 60 is fixed upon the shaft 59 and engages a cam roller 61 which is carried upon one end of the bell crank lever 62 whose elbow is pivoted upon the stationary bracket 63 carried upon the stationary upright 64 of the machine. The other end of the bell crank lever is coupled with the duplicate similarly positioned pawls 65 through the intermediation of the link 66. This link is attached at its upper end to the bell crank and at its lower end to the block 67. This block is journaled upon a stud 68 which is carried by the arm 69 that is journaled upon the shaft 58. The pawls 65 swing upon the stud 68 and are pressed against the peripheries of the two ratchet wheels 70 by the springs 71. The cam 60 is so shaped and so related to the shaft 59 that it will cause a movement of the pawls 65 60° during each revolution of the shaft 59, the pawls occasion a corresponding turning movement of the ratchet wheels 70. The two ratchet wheels are alike excepting that one of them is formed with notches 72 which are successively engaged by a holding dog 73 to prevent back lash of said wheels. The holding dog 73 is journaled upon a shaft 74 and is coupled with an arm 75. This arm is engaged by a cam 76 which is carried by the hub portion of the arm 69. Said cam serves to engage said dog within a notch 72 at the conclusion of each sixth turn of the ratchet wheels to hold these wheels in position. The arm 75 is pressed into engagement with the cam 76 by means of the spring 77, Fig. 1.

As a consequence of each sixth revolution of the ratchet wheels 70 the chain that has the links 53 is moved a distance exactly equal to the spacing between the upsetting punches of the spike heading die mechanisms which will now be described. The adjacent blocks 53 being similarly spaced apart, two of the spike blanks therein are presented to the die mechanisms at one time. The die mechanism generally indicated at 78 partially upsets the blunt end of the spike blank and the die mechanism generally illustrated at 79 finishes the upsetting of the spike blank, spike heads of one form jointly produced by these die mechanisms being illustrated in Figs. 2 and 3. When the machine is in full operation the second upsetting of the blunt end of one spike blank is effected by the die mechanism 79, while the first upsetting operation upon a fresh spike blank is effected by the die mechanism 78. The machine, in its preferred embodiment is thus in effect, a single blow machine producing a finished spike in each cycle of its operations and with other advantages which have hitherto been set forth.

The die mechanism 78 which initially operates upon each spike blank is partially illustrated in Fig. 7. This die mechanism includes a female die formed in two separable sections 80 and 81 which meet in the plane of a cavity that extends vertically completely through the die for receiving the spike blanks, one at a time, this cavity being enlarged at its upper end into partial conformity with the spike head that is to be ultimately produced. An upsetting punch 82 enters the enlarged portion of the cavity to perform the first upsetting operation upon the spike blank that is within the cavity. This punch is formed with a head 83 having a dove tailed tenon 84, which is receivable within the correspondingly shaped mortise in the lower end of a plunger 85, one wall of said mortise being furnished by a clamping block 86 which is bolted upon the plunger and which is employed to clamp the tenon 84 in place.

The die mechanism at 79 is generally similar to the die mechanism at 78, the parts of the die mechanism at 79 which correspond with the die mechanism at 78, thus far described, being given characters of reference respectively similar to those applied to the die mechanism at 78, but with added prime exponents. The enlarged portion of the cavity in the die 80', 81' is however larger than the enlarged portion of the die cavity 80, 81 to fully conform with the ultimate shape of the spike heads. The two female die sections of each die mechanism are held in assembly by suitable clamping devices with clamping jaws that carry them and by means of which jaws the spike blanks are held in place. These structural characteristics are illustrated most clearly in Fig. 6 in conjunction with the die mechanism 79 and will now be particularly described, it being understood that similar mechanism is employed in conjunction with die mechanism 78. The clamping jaws 87, 88 are arranged to slide transversely of the plane of travel of the spike blank carrying chain mutually toward each other to clamp the spike blanks between the female die sections and mutually away from each other to release the spike elements from between the said die sections. When the female die sections are separated the spike blank carrying chain is moved one step to shift the partially upset spike blank from between the female die sections of the die mechanism 78 to the cavity in the female die of the die mechanism 79, whereafter the sections of the latter die are closed about the partially finished spike preparatory to the depression of the punch 85' that completes the formation of the spike. The die sections 80, 81' being at the same time also closed to grip the fresh spike blank admitted therebetween. The female die section 81' is rapidly placed in its closed position by means of the wedge member 89 that is provided upon clamping jaw 88 and the wedge member 90 that is complemental to the wedge member 89 and which member 90 is secured to and depends from a plunger 91. When plunger 91 is elevated the roller $89^2$ which is carried by the bracket $89^3$ and which, in turn, is carried by the jaw 88 is operated upon by the wedge 90 to move the die section 81' to a withdrawn position toward the right. Each of the right hand female die sections is equipped with such a roller operating in this manner. Plunger 91 is formed with a cylindrical bore that receives and directs the punch carrying plunger 85'. After the jaw 88 has thus been rapidly positioned the jaw 87 is moved toward the jaw 88 to close the female die 80', 81'. The mechanism employed for positioning the clamping jaw 87 is inclusive of the toggle mechanism that contains the connected links 92 and 93, and the heel 94 on which the outer end of the link 92 is pivoted, the outer end of the link 93 being pivoted upon the jaw 87. The lower ends of the two upright links 95 are pivotally connected with the inner ends of the links 92, 93 and by means of the same stud 96 that connects the latter two links. The upper ends of the links 95 are pivotally connected at 97 with the bracket 98 which is secured to the hollow plunger 91. The relation of the links 95 to the links 92, 93 and the plunger 91 is such that when the wedge 90 initially engages the wedge block 89 the links 95 have not descended to a material extent nor do these links bring the links 92, 93 sufficiently into alignment to effect clamping action of the jaw 87 until the wedge 90 has had full engagement with the wedge 89 to firmly position the die section 81'. The punch plunger 85' and the hollow plunger 91 are both vertically reciprocated by means of the shaft 59 and suitable mechanism intervening between this shaft and said plungers. The lower end of the pitman 99 is pivotally connected to the upper end of the punch plunger 85'. The upper end of the pitman is provided with a split collar 100 that surrounds an offset cylindrical portion 59' of the shaft 59 whereby punch 85' is positively reciprocated. The hollow plunger 91 is provided with a stirrup 101 which rises therefrom. This stirrup carries a cam roller 102 at its upper end, this roller engaging a cam 103 which is fixed upon the body of the shaft 59. The cam 103 serves to elevate the hollow plunger 91. Gravity may be relied upon to lower this plunger. The operating movements of the plungers 85' and 91 are so relatively timed that the spike blank in the associated female die is firmly clamped in place upon the full descent of the plunger 91 before the punch 82' enters such die sufficiently to engage the upper end of the spike blank. The parts in Figs. 1 and 8 marked 90', 91', 92', 93', 94', 95', 96', 99', 100' pertain to the die mechanism 78 and are similar in function and construction to the parts having corresponding numerals applied thereto minus the exponents. The female dies of the die mechanisms 78 and 79 are provided with stripping rods 104, 104' for dislodging the spike or spike blanks after the upsetting operation upon such blanks. These rods are carried upon bars 105, 105' and project through the clamping jaws 87, 87' and into the corresponding female die cavities for the purpose of stripping spike blanks or spikes after the heading operations thereon. Fingers 106, 106' depend from the plunger 91, 91' and engage the bars 105 during the initial withdrawing movement of the clamping jaws 87, 87' and the female die sections coupled with these jaws to hold the rods temporarily and cause them to dislodge the spike or spike blanks from the die sections that are coupled with these jaws 87, 87'.

The finished spikes are removed by a slotted member 107 to which the spikes are conveyed by the conveyor chain, Fig. 1.

All of the machinery which has been illustrated and described may be driven by a single prime mover which furnishes power to a main driving shaft 108 by any suitable means, such as a pulley 109, which may be coupled with the prime mover by a belt. The shaft 108 may drive the shaft 59 through the intermediation of a spur pinion 110 on the former shaft and a spur gear 111 meshing with the pinion and provided upon the latter shaft. The sprocket pinion 112 also provided upon shaft 108 serves to drive the sprocket chain 28 which, in turn, drives a sprocket 113 that is provided upon shaft 27.

Changes may be made without departing from the spirit of the invention.

Having thus described my invention, I claim:—

1. A spike making machine including a female die formed with a cavity for receiving a spike blank, said cavity being enlarged into conformity with the shape of a spike head and said die being formed in two separable sections which meet in the plane of said cavity whereby the cavity is opened upon separation of said sections; an upsetting punch positioned to enter the enlarged portion of said cavity; mechanism for reciprocating the punch to insert it within and withdraw it from the enlarged portion of the cavity; a clamp including two jaws between which said female die is disposed, each of said jaws being movable toward and from the other; a wedging member coupled with said punch reciprocating mechanism and adapted for operating it to enable it to operate upon one jaw of the clamp to quickly position this jaw into holding relation with one of said die sections; and mechanism coupled with said punch reciprocating mechanism for moving the second clamping jaw toward the first to clamp the spike blank that is between the die sections, wherein there is a stripping rod that is projectable against a headed spike that is between the sections of the female die and wherein there is also a positioning device for said rod having a dimension enabling it to hold said rod in stripping relation to the spike during the initial part of the withdrawing movement of the second clamping jaw and thereafter to have escaping relation with said rod.

2. In a spike making machine in combination, a clamp including two jaws between which a female die formed in two separable sections is disposed, each of said jaws being movable toward and from the other; a wedging member; mechanism for operating said wedging member to enable it to operate upon one jaw of said clamp to quickly position said jaw into holding relation with one of said die sections; mechanism for moving the second clamping jaw toward the first clamping jaw to clamp a spike blank between said die sections; a stripping rod projectable against a headed spike that is between the sections of the female die; and a positioning device for said rod having a dimension enabling it to hold said rod in stripping relation to the spike during the initial part of the withdrawing movement of the second clamping jaw and thereafter to have escaping relation with said rod.

In witness whereof, I hereunto subscribe my name

CLARENCE H. FREDERICK.